US007356154B1

(12) United States Patent
Kotzin

(10) Patent No.: US 7,356,154 B1
(45) Date of Patent: Apr. 8, 2008

(54) AUDIO PLAYER ACTIVATED BY GREETING CARD RETRACTION

(76) Inventor: Garvin S. Kotzin, 22215 Camay Ct., Calabasas, CA (US) 91302

( * ) Notice: Subject to any disclaimer, the term of this patent is extended or adjusted under 35 U.S.C. 154(b) by 541 days.

(21) Appl. No.: 10/657,013

(22) Filed: Sep. 8, 2003

(51) Int. Cl.
*H04R 1/02* (2006.01)
*H04R 9/06* (2006.01)
*H02B 1/00* (2006.01)

(52) U.S. Cl. ...................... 381/334; 381/123; 381/124; 40/124.03

(58) Field of Classification Search ................ 381/334, 381/124; 700/94; 434/308, 311; 704/272; 369/30-31, 63; 340/568.1, 568.8, 568.4, 340/692, 568.7; 40/124.03
See application file for complete search history.

(56) References Cited

U.S. PATENT DOCUMENTS 5,418,520 A * 5/1995 Hirshberg ................ 340/568.7
5,569,868 A * 10/1996 Leung ......................... 84/600
5,795,209 A * 8/1998 Moore ......................... 446/73
6,184,788 B1 * 2/2001 Middlemiss et al. ..... 340/568.7
6,253,183 B1 * 6/2001 Boucard ..................... 704/272
2003/0005627 A1 * 1/2003 Temkin ......................... 47/72

* cited by examiner

*Primary Examiner*—Xu Mei
(74) *Attorney, Agent, or Firm*—Allen M. Shapiro

(57) ABSTRACT

The audio player is configured to be attached to a gift. In one embodiment, the audio player contains an electric circuit including a battery, a switch, an audio memory and loudspeaker in a series circuit. The switch is held open by a card positioned in a slot in the body of the audio player. The card usually contains the gift giver's and gift recipient's names and may contain a written sentiment. When the card is removed from the slot the switch is closed so that the memory produces a sequential signal. This is transformed by the loudspeaker into audible sound. The audible sound is a verbal or musical greeting, which may correspond to the occasion for which the gift is being presented. Other electrical and mechanical embodiments are disclosed.

7 Claims, 4 Drawing Sheets

FIG. 1
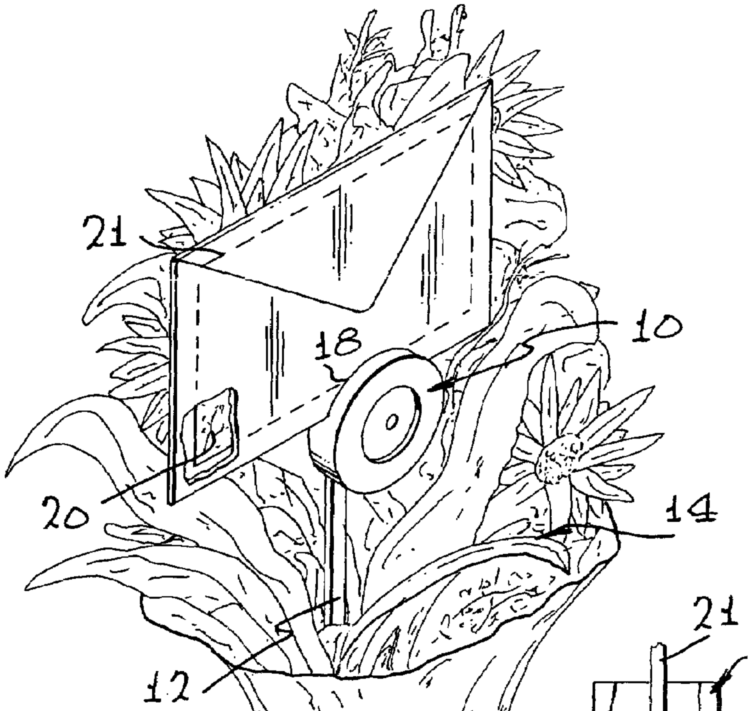
FIG. 2
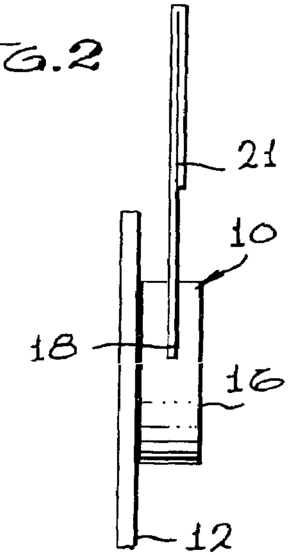
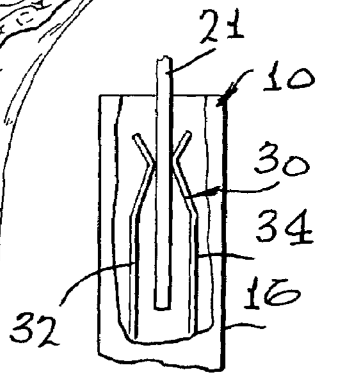
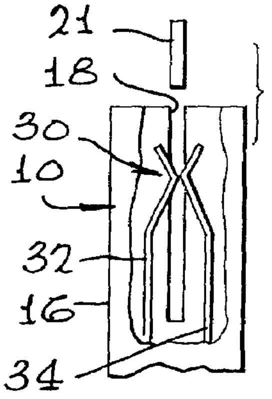
FIG. 3 FIG. 4 FIG. 5
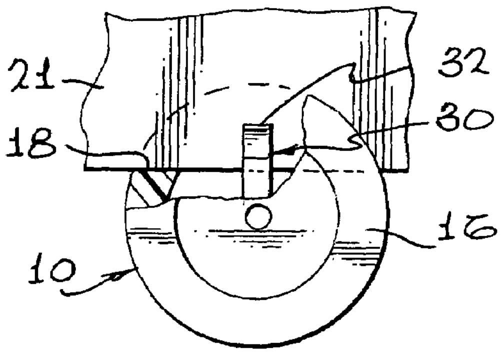
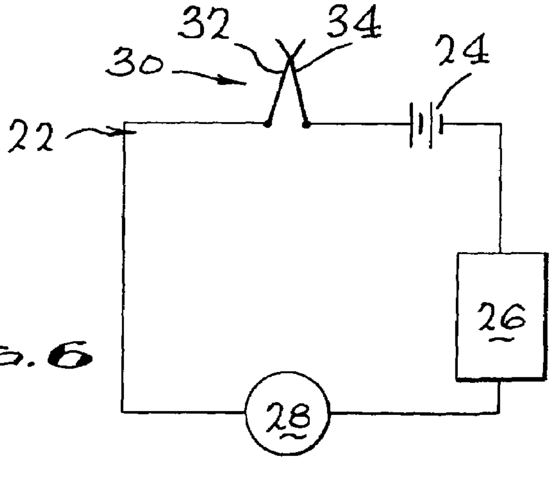
FIG. 6

FIG. 14
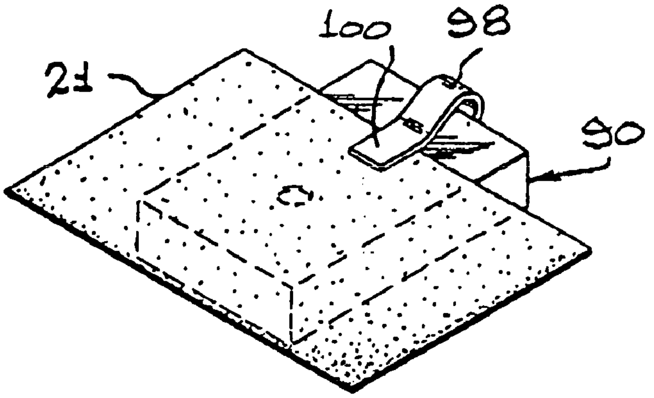
FIG. 15
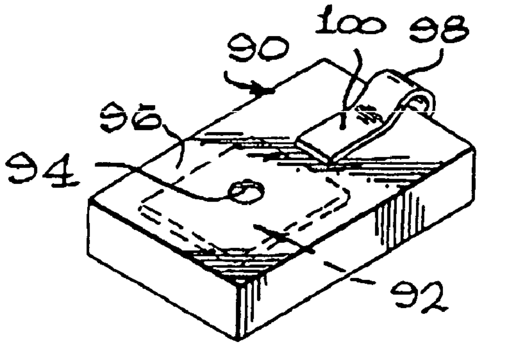
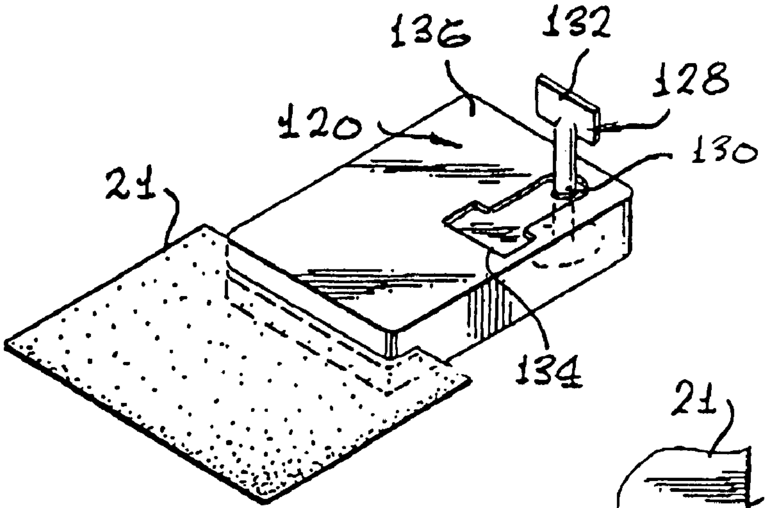
FIG. 16
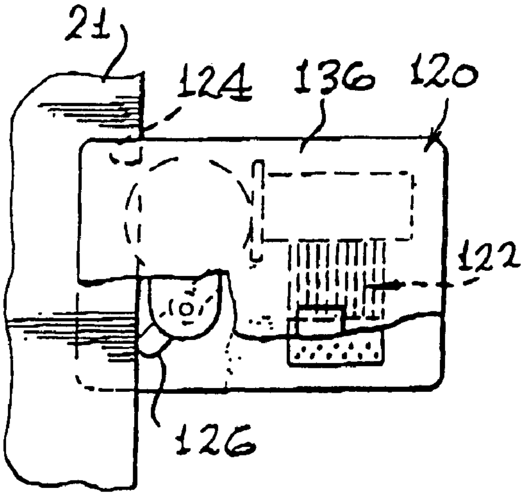
FIG. 17

AUDIO PLAYER ACTIVATED BY GREETING CARD RETRACTION

FIELD OF THE INVENTION

An audio player is programmed to play a verbal or musical greeting. The audio player is configured to be directly associated with a gift. Actuation of the audio player is by withdrawal of a greeting card or the like from retention by the audio player.

BACKGROUND OF THE INVENTION

When a gift is given it is usual to identify both the recipient and the giver. When the gift is flowers, a card identifying both the recipient and the giver is placed in an envelope and into a fork-topped post. The recipient withdraws the envelope and reads the card therein. On packages, a gift card in an envelope is usually associated with the package. Sometimes the envelope is attached to the package to help maintain it in position. Such cards may have a greeting or message thereon. The greeting or message is in the decoration and words of the usual greeting card.

SUMMARY OF THE INVENTION

In order to aid in the understanding of this invention, it can be stated in essentially summary form that it is directed to an audio player which is actuated by card retraction. The card is often a greeting card. The audio player is associated with a gift being given. In one case the audio player is on a post which is inserted into a bouquet of flowers. In another case the audio player is secured directly to a parcel containing a gift. In some embodiments, the audio player has a slot therein into which a card, usually in its envelope, is placed. In another embodiment, the card is retained as by a spring clip on the outside of the audio player so as to block light rays to a light-sensitive actuator for operation of the audio player. Withdrawal of the card from the audio player actuates the audio player so that it issues its musical or verbal audio greeting.

It is thus a purpose and advantage of this invention to associate an audio greeting with a card on a gift so that when the card is withdrawn for inspection the audio player is actuated.

It is another purpose and advantage of this invention to directly couple a greeting card with an audio player so that, when they are separated, the greeting card can be inspected and the audio player provides its audio announcement and/or music.

It is another purpose and advantage of this invention to provide an audio player which can be attached to various different gift parcels from flower arrangements to packaged gifts and also to a card such as a greeting card which is associated with the audio player and thus with the gift.

It is a further purpose and advantage of this invention to provide an audio player which can be conveniently configured to illustrate a particular event, sport or situation so as to complement the event for which the gift is being given.

The features of this invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of the audio player actuated by greeting card retraction shown with a bouquet of flowers.

FIG. 2 is an enlarged side elevational view thereof.

FIG. 3 is a further enlarged front view thereof, with parts broken away and parts taken in section.

FIG. 4 is a further enlarged view through the audio player, with parts broken away, showing how the card maintains the switch actuators in the unactuated position.

FIG. 5 is a similar view, showing the card retracted and showing the switch actuators in the audio player actuating position.

FIG. 6 is a schematic electrical diagram.

FIGS. 14 and 15 are perspective views of another embodiment of the audio player using a light-sensitive actuator which is blocked by a card temporarily retained on the outside of the audio player.

FIG. 16 is a perspective view of another embodiment of the audio player using a mechanical wind-up type with a card inserted into the player to obstruct operation.

FIG. 17 is a top plan view thereof, partially broken away and fragmented.

DESCRIPTION OF THE PREFERRED EMBODIMENTS

Figure 9:
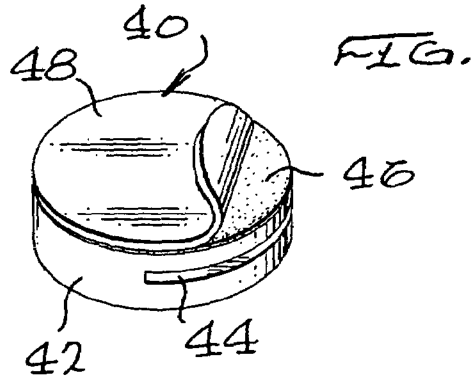
FIG. 9 is a back view of the audio player, showing a protective slip sheet partially peeled back from its pressure-sensitive adhesive.

The first preferred embodiment of the audio player of this invention is generally indicated at 10 in FIGS. 1, 2, 3, 4 and 5. The audio player 10 is mounted on post 12 which is suitable to be inserted into a bouquet 14 or a potted plant. The flower arrangement in its container in FIG. 1 also discloses a pot with a plant therein. The purpose of the post is to support the audio player 10 in a conveniently accessible location. The audio player 10 has a body 16 which is mounted on the post. The body has a slot 18 therein. The slot is sized so that a card or a card 20 can be inserted therein. The card 20 may be a greeting card. The greeting card may call attention to a specific event such as a birthday or wedding anniversary or holiday. Usually the card is enclosed in an envelope 21, as shown. The envelope may carry the gift recipient's name on it and the card may simply carry the giver's name thereon. Usually however, a sentiment is included with the giving of the flowers.

The audio player 10 carries various electrical devices in a circuit 22. These devices are contained within the body 16.

The devices include a battery 24, an audio generator 26 and a loudspeaker 28. These components are serially connected with a switch 30. The switch 30 includes switch fingers 32 and 34. As illustrated in FIGS. 4, 5 and 6, the switch fingers contact each other and provide continuity to the circuit when there is nothing between them, as seen in FIG. 5. When the card 20 is positioned between the switch fingers as seen in FIG. 4, the circuit is incomplete. Thus, the audio player is at rest until the card 20 is pulled from between the switch fingers. When the card is pulled, the circuit is complete. The switch fingers are card retraction actuated which has two functions. One function is to control the energization of the audio generator. The second function is to releaseably hold the card. The audio generator 26 generates a sequence of electronic signals which are presented as audible sound to the listeners by loudspeaker 28. The sounds may be music or may be a verbal greeting or a combination. The music may be consistent with the subject of the event. The music may be a love song upon the presentation of flowers. It may be a patriotic song for one of the national holidays. It may be a birthday song for celebrating a birthday anniversary. If the audio player presents a voice message, the voice message would be correlated with the circumstances of the gift giving.

When a man gives a bouquet to his lady friend, he signs the card 20 and places it in its envelope. He addresses the envelope with the name of the gift recipient and places the envelope and card into the slot 18. This prevents electrical continuity so that the audio player is silent. When the bouquet is presented and the recipient withdraws the envelope and card from the slot in the audio player, the audio player presents its greeting.

While the card 20 is seen as directly maintaining the contacts open in the switch 30, the switch fingers 32 and 34 are switch actuators which are acted upon by the card and the actual contacts may be away from that card-engaging point.

Figure 7:
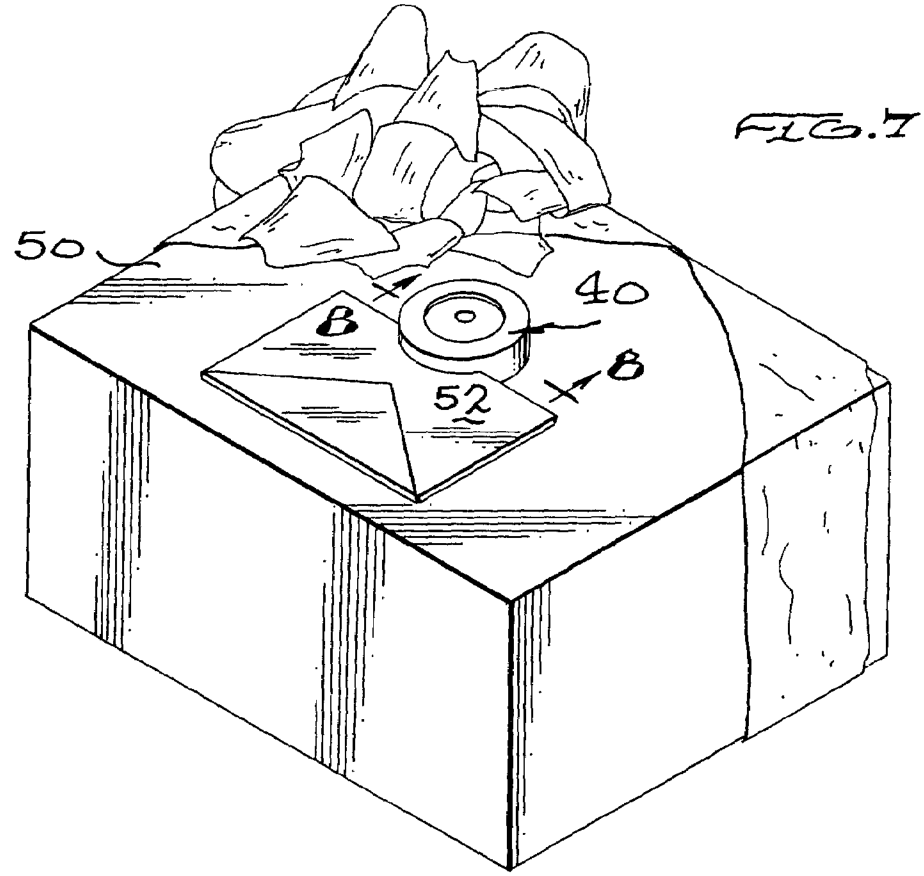
FIG. 7 is an isometric view showing the audio player of this invention configured to be attached to a package and showing it attached.
Figure 8:
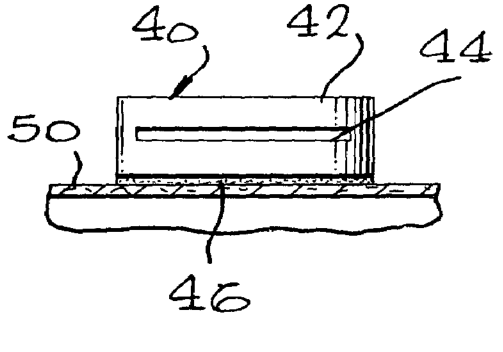
FIG. 8 is an enlarged section taken generally along line 8-8 of FIG. 7.

FIGS. 7, 8 and 9 generally indicate a further preferred embodiment of the audio player which is generally indicated at 40 and has a body 42 which is in the form of a disk with a slot 44 therein. The audio player 40 contains the same operative parts as the audio player 10. One side of the body carries pressure-sensitive adhesive 46, see FIG. 9, which is protected by slip sheet 48. This configuration permits removal of the slip sheet for adhesive attachment of the audio player 40 to a package 50. The package 50 may carry a gift for the recipient. A card 52 is inserted into the slot 44 and holds open the switch actuator within the slot.

Package 50 contains a gift for the recipient. Card 52 is in an envelope which carries an address which designates the recipient. Card 52 may contain a suitable sentiment and carry the name of the giver. The recipient and giver are both identified and the card is associated with the gift by its insertion into the slot 44 of the audio player. When the card is removed the audio player is actuated to produce sound relevant to the occasion. It may be a musical or verbal greeting.

Figure 10:
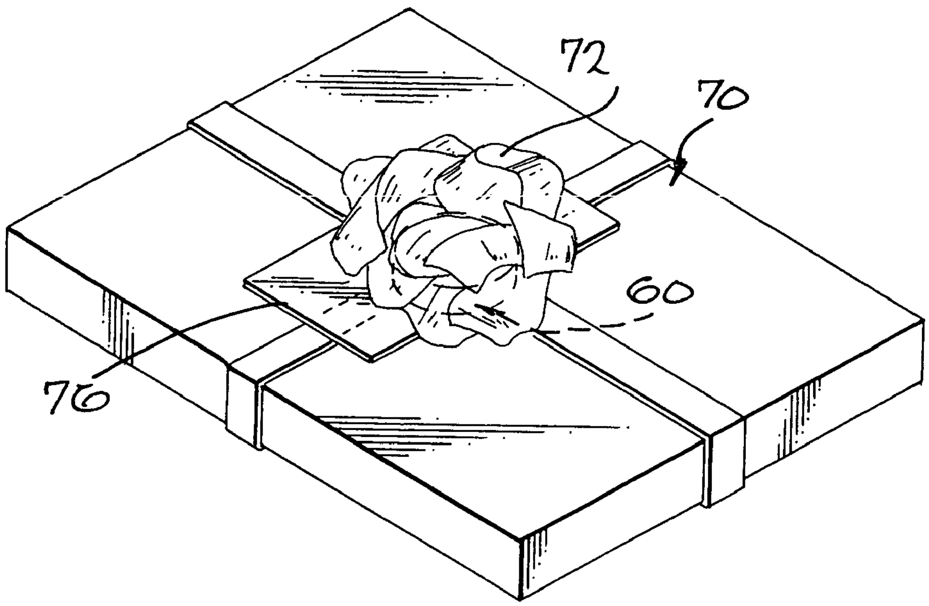
FIG. 10 is a perspective view of a package carrying another preferred embodiment of the audio player of this invention.
Figure 11:
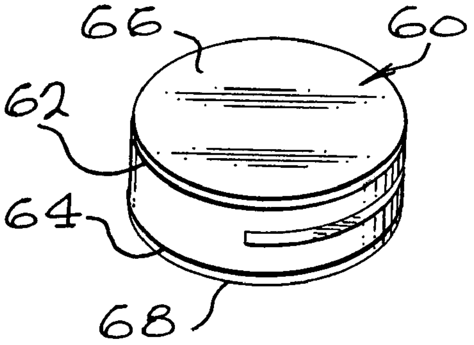
FIG. 11 shows another embodiment of the audio player of this invention showing adhesive on both faces thereof.

FIGS. 10 and 11 illustrate audio player 60. Audio player 60 has the same operative parts as audio player 10 and the same external configuration as the audio player 40. However, the audio player 60 has an adhesive layer on each of its top and bottom faces. Adhesive layers 62 and 64 are respectively shown as being protected by slip sheets 66 and 68. By the use of the two adhesive layers, the audio player 60 can be attached to the top of package 70, after removal of the slip sheet 68. Thereupon, the audio player 60 can be partially hidden by the application of a covering thereon.

The covering is preferably a decorative covering such as a ribbon made into a bow 72. Before the package wrapping is complete, the lower slip sheet 68 is removed and the audio player is attached to the package 70. Thereupon the upper slip sheet 66 is removed and the bow 70 is attached thereto. The bow does not completely cover the audio player but permits access to the slot 74. The slot 74 receives the card 76 which preferably contains the recipient's and the giver's identification, together with a suitable message. The card may or may not be in an envelope. Removal of the card initiates action by the audio player.

Figure 12:
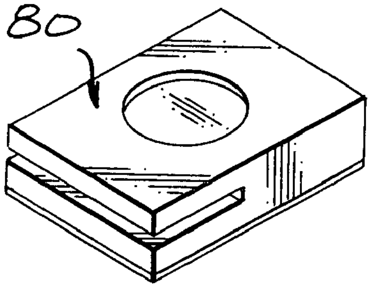
FIG. 12 is a perspective view of another embodiment of the audio player wherein it is in its rectangular configuration.

The external configuration of the audio player is not important to its uses as long as the configuration is not obtrusive. The appearance of the audio player should be as unobtrusive as possible. FIG. 12 illustrates an audio player 80 which is a rectangular configuration. Its other characteristics are the same as audio player 10.

Figure 13:
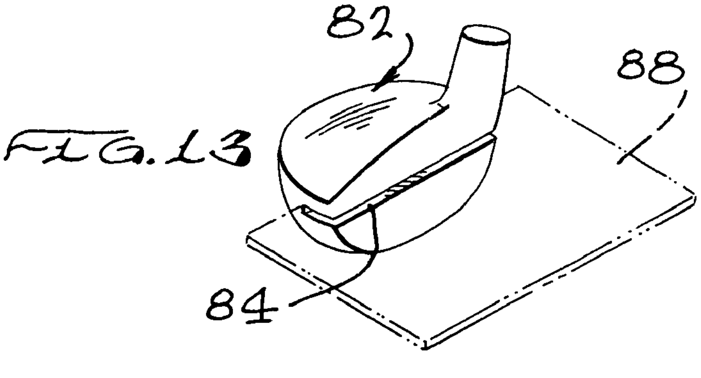
FIG. 13 is a further embodiment of the audio player of this invention showing it in the configuration of the head of a golf club, illustrating that the audio player may be in different configurations which are compatible with the sense of the greeting card with which it is employed or sense of the occasion for which the greeting card is presented.

The audio players 10, 40, 60 and 80 have an exterior configuration which is intended to be unobtrusive. The external configuration of audio player 82, seen in FIG. 13, is intended to complement the nature of the event for which the gift is given. As an illustrative example, the external shape of the audio player 82 is that of the head of a golf club. This configuration would be suitable for giving a gift which is related to golf. It would be suitable for prizes given at golf tournaments. The audio player and its card may be the entire prize or may be attached to a package containing a different prize. The audio player 82 has a slot 84 therein which receives a card 88. As with the previously described audio players, the insertion of the card prevents actuation of the audio signal, and removal of the card causes the audio signal to be produced.

It should be noted that the card 20 and its envelope 21 are normally electrically non-conductive as when they are basically paper products. Thus, they each, when used separately or together, function to interrupt the electrical circuit 22. However, the card 20 may be composed of electrically conductive material as long as it is used as an insert into the non-conductive envelope 21. Furthermore, switch contacts 32 and 34 may be configured to have non-conductive extensions or additions which may be operated by conductive cards and/or envelopes in a similar manner.

Another embodiment is seen in FIGS. 14 and 15. An audio player 90 is shown with a light-sensitive actuator 92 below an aperture 94 in the upper surface 96 of the case for the audio player 90. The circuitry in the audio player 90 may be the same or similar to that illustrated in FIG. 6, for example, with the actuator 92 functioning as the switch 30. On the other hand, the actuator 92 may be a photovoltaic cell and function as a powersource replacement for battery 24. Thus, when the top surface 96 is exposed to sufficient ambient light, the light received by the actuator 92 through the hole 94 will cause the audio player to operate. In accordance with this invention, a resilient spring clip 98 is secured to the audio player 90 as at the edge of the surface 96; with a tong 100 extending towards the hole 94 and closely adjacent the surface 96. As seen in FIG. 14, when a card 21 is inserted between the spring clip 98 and the audio player 90, the card blocks light rays from entering the audio player 90 through the hole 94. When the recipient pulls the card 21, the light hole 94 is exposed for operation of the audio player 90. In this embodiment, the card may be made of metal and/or other electrically conductive material as long as it is opaque to light, and may be disposed in an envelope (not shown) as previously described.

In referring to FIGS. 16 and 17, there is shown an embodiment 120 employing conventional mechanical music box indicated diagrammatically in broken lines at 122 in FIG. 17. A conventional mechanical music box has various rotatable and rotating gears, fly wheels and other mechanism and, according to the present invention, a slot 124 is provided for insertion and reception of the card 21 so that, when in place, the card blocks rotation of a music box element such as, as shown in FIG. 17, a fly wheel protrusion 126. When the card is removed, the rotational obstruction is removed and, thus, the audio player is free to operate in a normal manner. Since this audio player is intended to be used, as previously described, as a gift attachment to flowers or a box, it may be desirable to remove the conventional windup key before completing the gift wrapping. Under those circumstances, the key might be lost or otherwise become unavailable to the recipient if it is desired to rewind the mechanism. According to the present invention, the key 128 is provided with a pivoted junction 130 so that the exposed part 132 of the key can be pivoted downwardly into an appropriately mating recess 134 in the upper surface 136 of the audio player. Thus, in use, the key 128 is not obtrusive and yet is available to the recipient for later use.

This invention has been described in its presently contemplated best modes and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An audio player comprising:

a body, an audible sound producing device in said body, a control device for controlling said audible sound producing device;

walls in said body defining an opening into said body, said control device being adjacent said opening, said opening in said body being configured so that, when a greeting card is retained at said opening, said control device causes said audible sound producing device to be inactive and, when the greeting card is removed from said opening, said control device causes said audible sound producing device to be active and produce audio signals which are consistent with the sentiment of the greeting card; and support structure for supporting said body with respect to a gift which has sentiment consistent with the greeting card.

2. The audio player of claim 1 wherein said support structure is a post on said body.

3. The audio player of claim 1 wherein said body is in the form of a flat disk having faces and at least one side wall joining said faces, said opening being a slot in said side wall, one of said faces having said support structure thereon.

4. The audio player of claim 1 wherein said audible sound producing device within said body is an electrical audio player and said control device is a switch, said switch being positioned adjacent said opening so that the card within said opening opens the circuit to said audio player.

5. The audio player of claim 4 wherein said opening is a slot in said body.

6. The audio player of claim 4 wherein said audible sound producing device is in the form of a flat disk having faces and at least one side wall joining said faces, said opening being a slot in said side wall.

7. The audio player of claim 4 wherein said support structure is a post, said post being configured to be inserted into a plant.

* * * * *